R. C. BOWMAN.
HARROW.
APPLICATION FILED DEC. 17, 1908.

940,501.

Patented Nov. 16, 1909.
3 SHEETS—SHEET 3.

Witnesses
James F. Crown
Madelon E. Burns.

Inventor
Roy C. Bowman
By Watson E. Coleman
Attorney

UNITED STATES PATENT OFFICE.

ROY C. BOWMAN, OF WEST AUSTINTOWN, OHIO.

HARROW.

940,501.

Specification of Letters Patent. Patented Nov. 16, 1909.

Application filed December 17, 1908. Serial No. 468,070.

*To all whom it may concern:*

Be it known that I, ROY C. BOWMAN, a citizen of the United States, residing at West Austintown, in the county of Mahoning and State of Ohio, have invented certain new and useful Improvements in Harrows, of which the following is a specification, reference being had to the accompanying drawings.

This invention relates to improvements in harrows and similar implements for breaking up and pulverizing ground after it has been plowed.

The object of the invention is to improve and simplify the construction and operation of implements of this character and thereby render them less expensive and more durable and efficient.

With the above and other objects in view, the invention consists of the novel features of construction and the combination and arrangement of parts hereinafter fully described and claimed, and illustrated in the accompanying drawings, in which—

Figure 1:
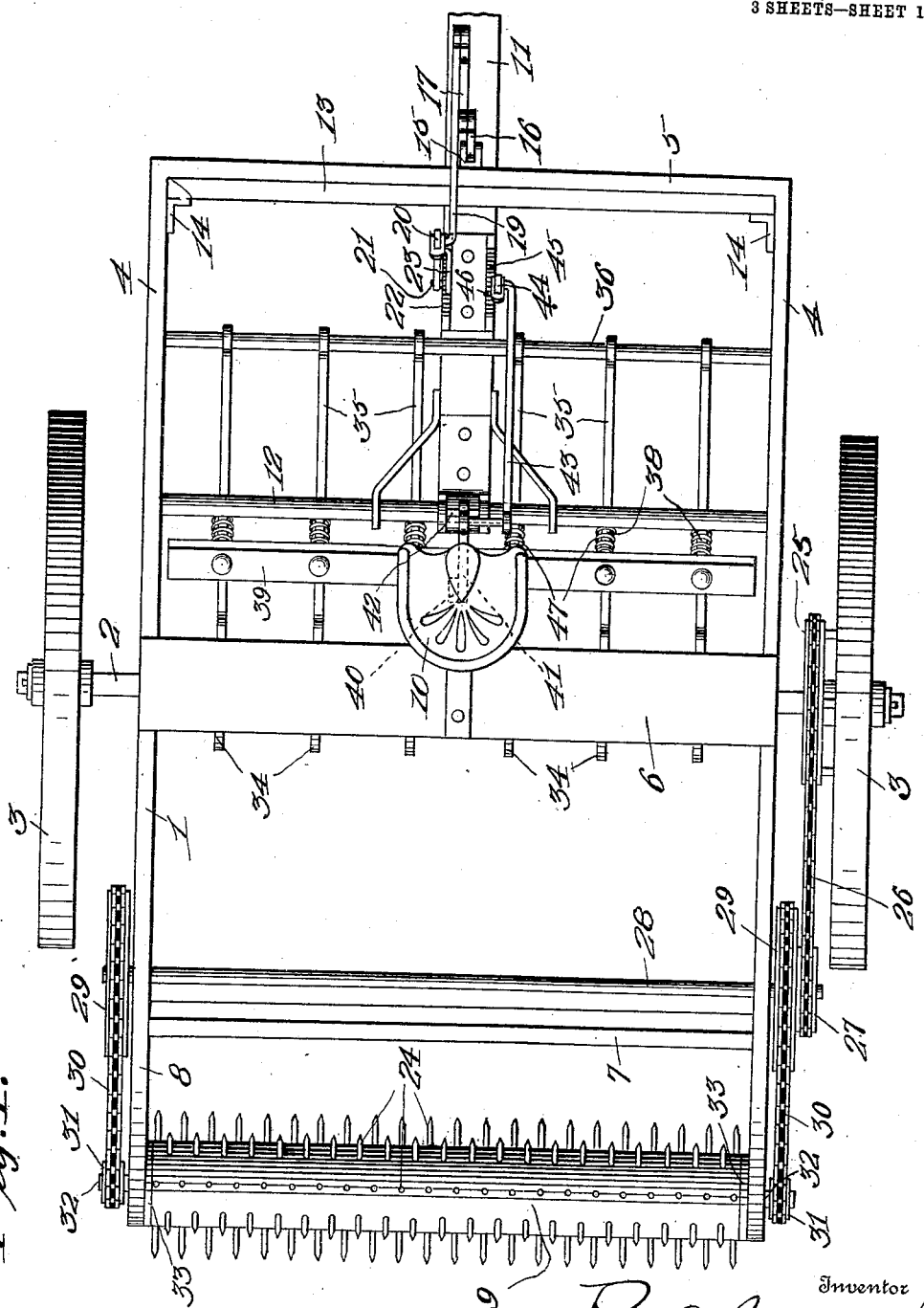
Figure 2:
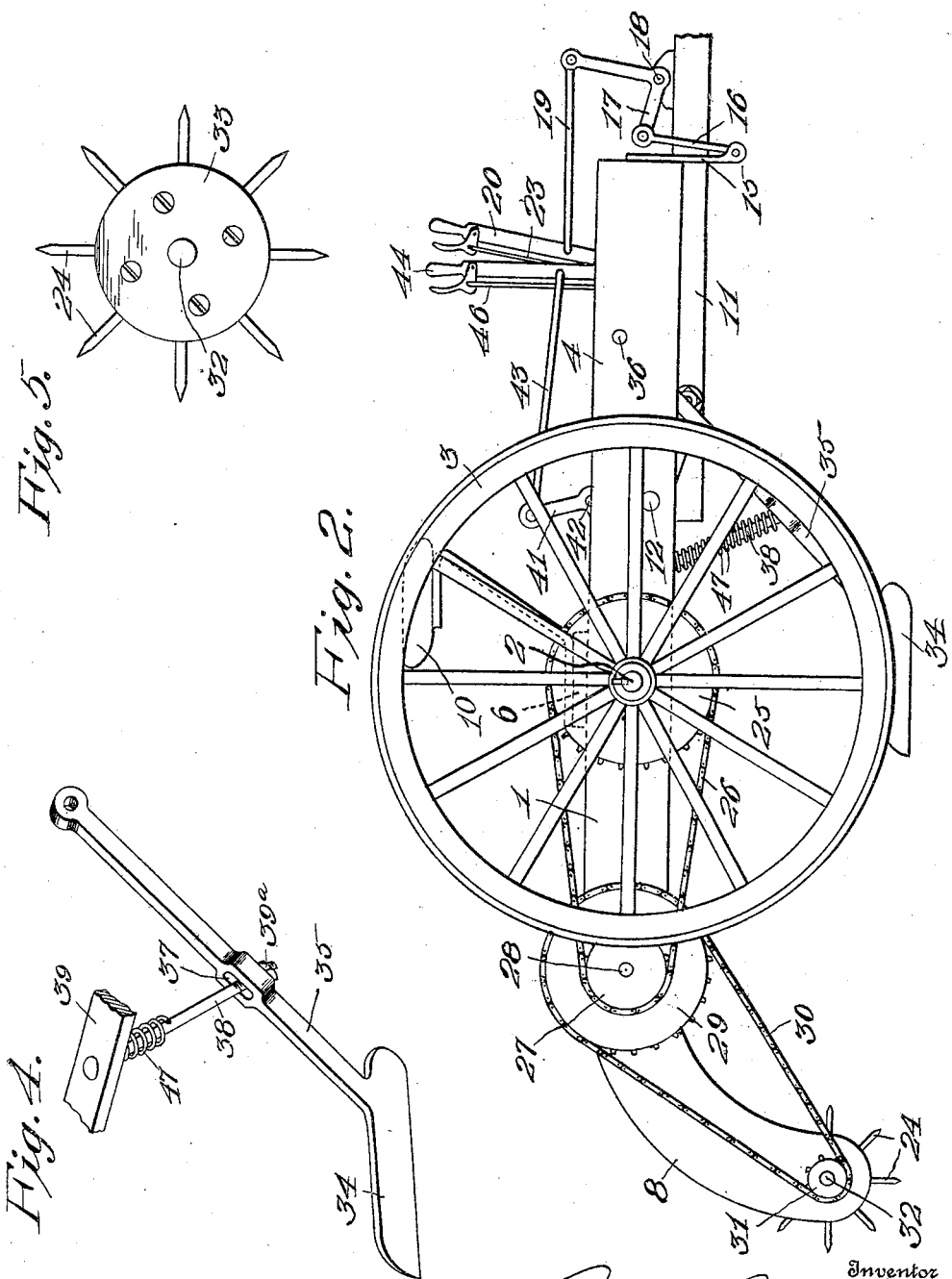
Figure 3:
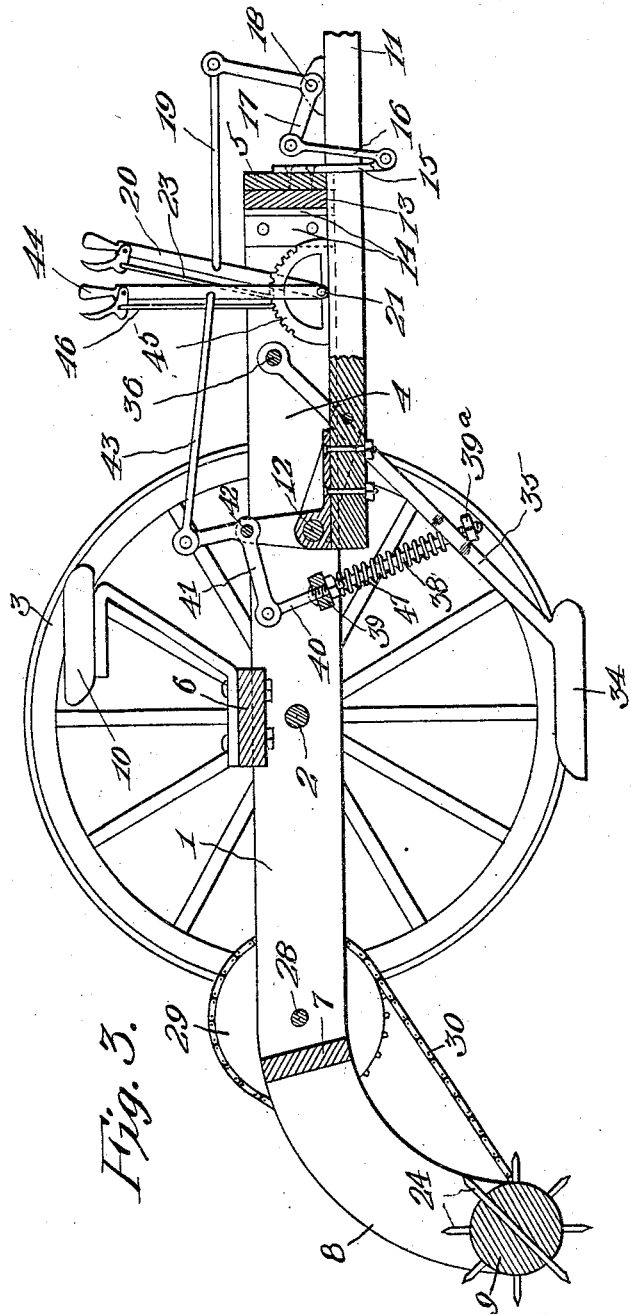

Figure 1 is a top plan view of the improved harrow; Fig. 2 is a side elevation; Fig. 3 is a vertical longitudinal section; Fig. 4 is a detail perspective of one of the clod cutters; and Fig. 5 is an end view of the toothed pulverizing roll or harrow.

The invention comprises a main frame 1 supported by and mounted for vertical swinging movement on an axle 2 carrying supporting and drive wheels 3. The frame 1 is horizontally disposed and of substantially rectangular form consisting of two side bars 4 united by a front cross bar 5, a seat supporting bar 6 and a rear cross bar 7. The latter is arranged adjacent to the downwardly extending rear ends 8 of the side bars 4, which ends 8 form hangers for the journals of a toothed pulverizing roll or harrow 9. A seat 10 is arranged upon a supporting spring attached to the cross bar 6.

The frame 1 is mounted for tilting or swinging movement for the purpose of positioning the pulverizing roll or harrow 9 with respect to the ground and the adjustment of said frame is effected by raising and lowering its front end with respect to a draft tongue 11 to which the draft animals are attached. The rear end of said tongue extends under the front end of the frame and is pivoted to a transverse shaft or bar 12 arranged between the side bars 4 of the frame. Projecting upwardly from the upper side of the tongue is a slide 13 adapted to enter the frame 1 just in rear of its front cross bar 5 and to have its ends guided between said bar and angle metal guide cleats 14 secured on the inner faces of the side bars 4 in spaced relation to the cross bar 5, as clearly shown in Figs. 1 and 3 of the drawings.

Attached to and depending from the cross bar 5 is a bracket 15 which is connected by a link 16 to one arm of a bell crank 17 fulcrumed at its angle in a bearing 18 on the top of the tongue and having its other arm connected by a link 19 to an adjusting lever 20. The latter is preferably in the form of a hand lever pivoted at its lower end, as shown at 21, concentric with a segmental locking rack 22 with which co-acts a locking pawl 23 carried by said lever. It will be seen that when the pawl 23 is retracted and the lever 20 is operated the bell crank 17 may be shifted to raise or lower the front end of the frame with respect to the tongue and, consequently, to raise or lower the pulverizing wheel or harrow 9 with respect to the ground, the frame 1 swinging upon the axle 2. Said pulverizing wheel or harrow 9 is in the form of a wooden cylinder through which are passed double pointed toothed rods 24 of such length that their pointed ends project beyond the surface or periphery of the cylinder or roll and form radiating teeth which effectively break up or pulverize the ground when the roll or wheel is rotated. Said pulverizing roll is driven from one of the ground wheels 3 which has fixed to it a sprocket wheel 25 connected by a sprocket chain 26 to a sprocket pinion 27 fixed to one end of a transverse shaft 28 extending between and journaled in the side bars 4 of the frame 1. Fixed to the shaft 28 on the outside of the bars 4 are sprocket wheels 29 which are connected by sprocket chains 30 to sprocket pinions 31 fixed to the projecting ends of journals or trunnions 32 of the pulverizing roll 9. Said journals 32 rotate in bearing openings in the hangers 8 and have formed integral with their inner ends circular plates or disks 33 which are secured to the ends of the roll 9 concentric with the same.

For the purpose of rendering the work performed by the pulverizing roll or harrow 9 more effective, an improved clod cutting mechanism is carried by the frame 1 and operates in advance of said pulverizing roll. This cutting mechanism consists of a plurality of cutter shoes or blades 34 disposed angularly on the lower ends of upwardly and forwardly inclined hanger bars 35, the upper ends of which are hung for swinging movement from a transverse pivot rod 36 arranged between the side bars 4 of the frame 1. Each of the bars 35 has its intermediate portion formed with an enlargement containing an elongated opening or slot 37 for a controlling rod 38 which has its lower end passed through said slot and provided with an adjusting nut 39ᵃ. The upper end of the rod 38, which is in the form of a bolt, is passed loosely through an opening in a transverse bar 39, the latter serving to connect all of the cutter carrying bars 35 for simultaneous movement. A link 40 connects the central portion of the bar 39 to one arm of a bell crank 41 which is pivoted at its angle, as shown at 42, in a bearing on the tongue 11 and has its other end or arm connected by a link 43 to a lever 44. The latter, which is preferably a hand lever, is pivoted at its lower end concentric with a segmental locking rack 45 with which co-acts a locking pawl 46 carried by said lever. A coil spring 47 is arranged upon each of the hanger rods or links 38 and confined between the bar 39 and the cutter carrying bar or hanger 35 for the purpose of actuating the latter downwardly and yieldably holding its cutter 34 down upon the ground.

In operation, it will be seen that when the clod cutters 34 and the toothed pulverizing roll or harrow 9 are lowered in operative position, as shown in Fig. 3, and the machine is drawn forwardly by draft animals, the cutters 34 will effectively break up large clods of earth and the teeth 24 of the roll 9 will then thoroughly pulverize the same. By means of the levers 20 and 44 the cutters and pulverizing roll or harrow may be adjusted according to the nature of the ground being operated upon and when either or both of said devices are not needed they may be elevated to an inoperative position and fastened in such position.

Having thus described the invention what is claimed is:

1. A harrow comprising an axle, supporting and drive wheels thereon, a vertically tilting frame mounted intermediate its front and rear ends on said axle, a toothed pulverizing roll carried by the rear end of said frame, driving connections between said roll and one of the wheels, a tongue pivoted to the main frame, a transverse slide bar upon the tongue, guides upon the frame, and engaged with the ends of said slide bar and an adjusting means between the frame and tongue.

2. A harrow comprising a restangular main frame having downwardly inclined hangers extending from the rear ends of its side bars, a transverse axle arranged intermediate the ends of the main frame and from which the latter swings, supporting and drive wheels upon said axle, a pulverizing roll journaled in said hangers at the rear of the frame, driving connections between said roll and one of the wheels, a transverse pivot in the forward portion of the frame, a tongue hung from said pivot and extending under the front end of the frame, an upright transversely extending slide bar upon said tongue and engaged with the front cross bar of the frame, guide members secured to the side bars of the frame and engaged with the ends of the slide bar, a bracket depending from the front cross bar of the frame, a bell crank pivoted on the tongue, a link connecting one arm of said bell crank to said bracket and means upon the tongue and connected to the other arm of said bell crank for adjusting the same.

In testimony whereof I hereunto affix my signature in the presence of two witnesses.

ROY C. BOWMAN.

Witnesses:
 DAVID ANDERSON,
 FANNIE ANDERSON.